July 28, 1959 — I. JEPSON — 2,896,924
MIXING DEVICE
Filed Nov. 9, 1955 — 2 Sheets-Sheet 1
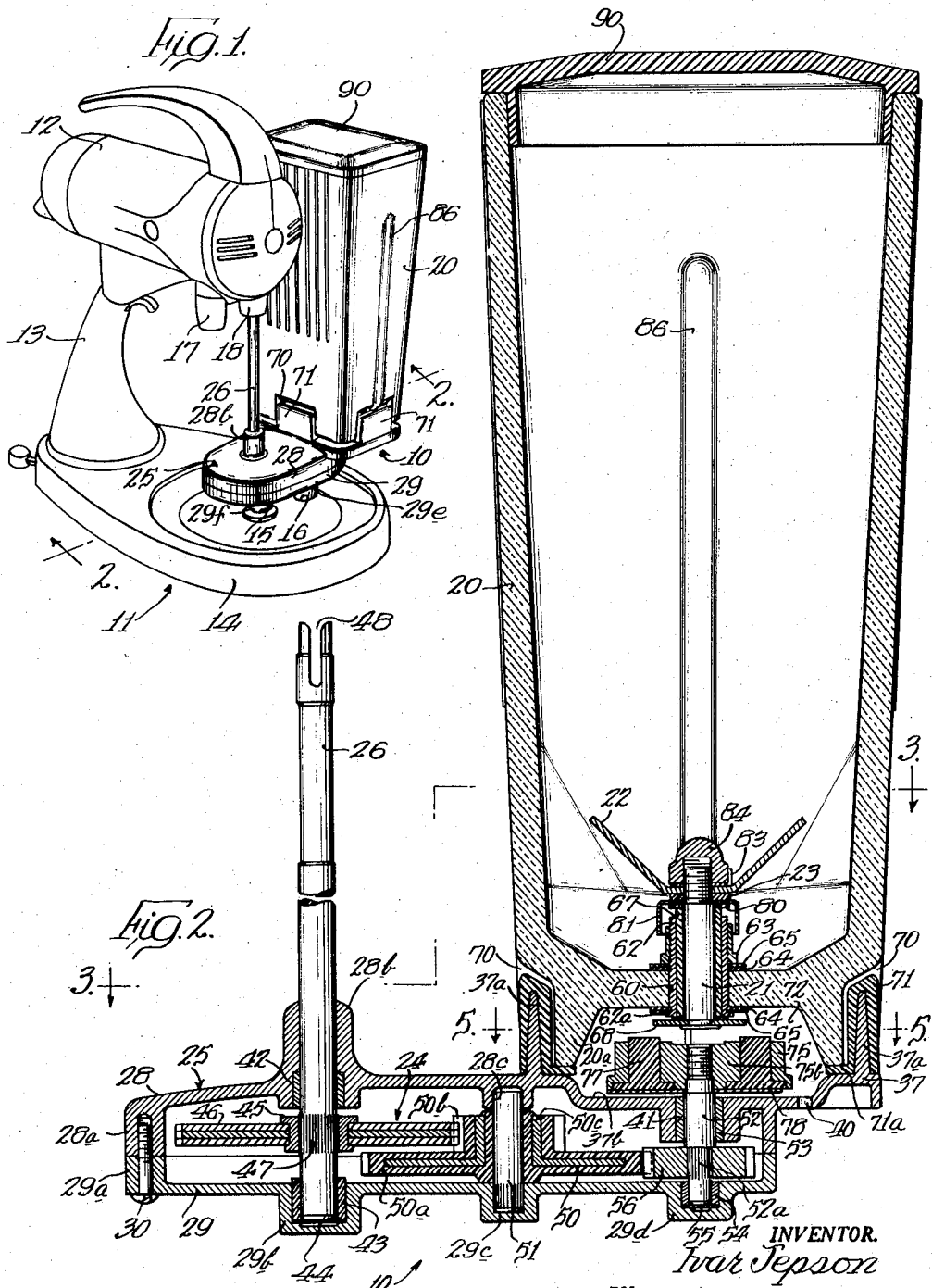
INVENTOR.
Ivar Jepson
BY Mason, Kolehmainen, Rathburn & Wyss
Attys.

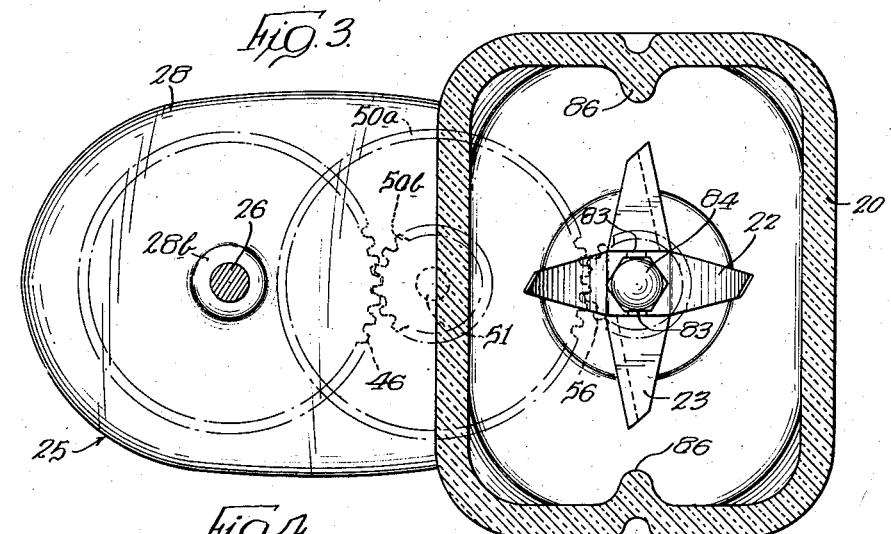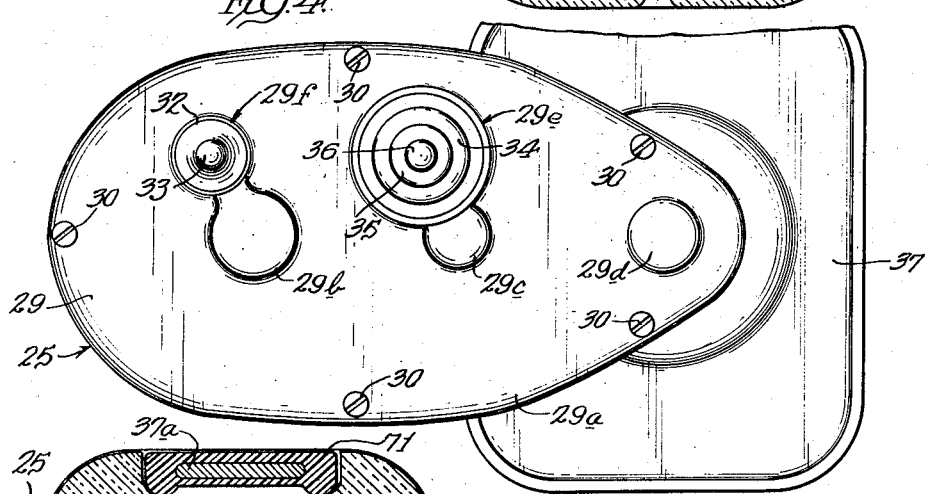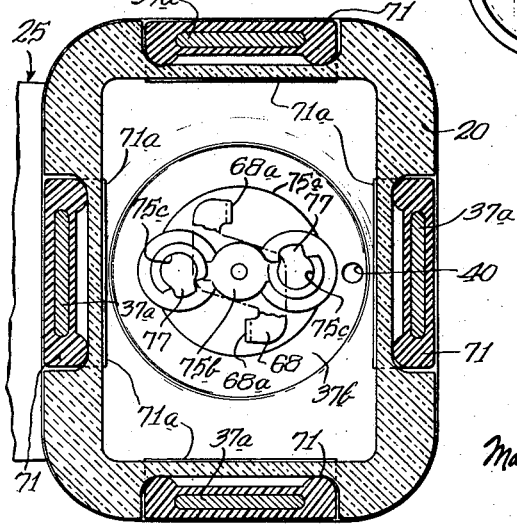

United States Patent Office 2,896,924
Patented July 28, 1959

2,896,924

MIXING DEVICE

Ivar Jepson, Oak Park, Ill., assignor to Sunbeam Corporation, Chicago, Ill., a corporation of Illinois Application November 9, 1955, Serial No. 545,836

4 Claims. (Cl. 259—108)

The present invention relates to a mixing device and more specifically to a mixing device in the form of an attachment for a home food mixer which functions in the manner of the appliance generally referred to as a blender.

For some years now there has been available on the market an electric appliance commonly referred to as a blender which has been found to be very satisfactory for blending, chopping, shredding, pulverizing, liquefying, churning and the like. Such blenders have been fairly expensive and still more important, comprise an additional appliance which may not be used every day, but which must be stored by the housewife, many times in storage facilities which are not adequate. On the other hand, almost every household today has the conventional kitchen mixer which is no longer considered a luxury but a necessity. To avoid the requirement of a separate and expensive appliance for performing the blending function, it would be desirable to provide a simple attachment for the conventional kitchen mixer, many millions of which have been sold and are in use in the United States and elsewhere in the world today. This attachment should be simple and compact and inexpensive and yet should be capable of performing the same operation as the blender, as it is called, which has become popular in recent years. As an attachment to the conventional kitchen mixer a very simple device can be provided, since the prime mover of the kitchen mixer, which is probably the most expensive component of any mixer is already available, and it is merely necessary to provide in a simple attachment, driven from the conventional kitchen mixer, the apparatus for performing the blending and related functions.

Accordingly, it is an object of the present invention to provide a simple and compact attachment for a conventional kitchen mixer which will convert the mixer into a device capable of blending and performing other functions of the so-called blender extensively sold on the market today.

It is another object of the present invention to provide a new and improved mixing device which is adapted to rapidly and effectively convert solids, such as fresh fruit, vegetables and substances such as fine powder or liquid into a uniform and creamy mixture thoroughly impregnated with air bubbles.

It is another object of the present invention to provide an improved disintegrating and mixing unit which is simple and compact, attractive in appearance and which is readily attachable to be driven from the power unit of the conventional kitchen mixer.

It is a further object of the present invention to provide an improved blending device having simple and improved means for connecting the rotatable mixing element with an external driving means therefor.

Still another object of the present invention resides in an improved device for mixing foods and the like having a greatly improved container design which is easy to clean and simple to handle in use.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is a perspective view of a well-known kitchen mixer with which is associated the blender attachment of the present invention;

Fig. 2 is an enlarged sectional view taken on line 2—2 of Fig. 1 to show in detail the construction of the blender attachment of the present invention;

Fig. 3 is a sectional view taken on line 3—3 of Fig. 2 assuming that Fig. 2 shows the complete structure;

Fig. 4 is a bottom view of Fig. 2, again assuming that Fig. 2 shows the complete structure; and Fig. 5 is a sectional view taken on line 5—5 of Fig. 2 again assuming that Fig. 2 shows the complete structure.

Briefly, the present invention concerns an attachment driven from the conventional household kitchen mixer which functions as a blender. It comprises a vessel through the bottom of which extends a cutter shaft for rotatably supporting within the bottom of the vessel a plurality of cutters rotating at high speed. The lower end of the cutter shaft is provided with a clutch member adapted to be drivingly engaged with a cooperating clutch member associated with a step-up gear unit including a gear casing within which are mounted a plurality of rotating gears, and including a drive spindle extending in the same general direction as the longitudinal axis of the mixing vessel but disposed to one side of the mixing vessel. This drive spindle is arranged to be drivingly connected to the conventional kitchen mixer. An improved vessel is employed which insures easy handling and thorough mixing, blending and the like.

The conventional kitchen mixer is extensively employed to stir or otherwise agitate several liquids and materials which are generally liquid in nature even though they may be quite viscous. When it is attempted to mix pulpy or fibrous materials, such as fruits, nuts and the like with a liquid to produce a mechanical mixture, the mixing problem becomes more difficult and for this purpose the conventional kitchen food mixer is not fully suited. It was for this reason that the so-called blender was developed, capable of disintegrating solid constituents having a pulpy fibrous nature, and also being able to aerate a thick or semi-fluid mixture of materials. Such a blender should be capable of accomplishing the mixing and disintegrating function in a very short period of time. Moreover, it can perform a variety of functions which might be termed blending, chopping, shredding, grinding, pureeing, grating, beating, whipping, pulverizing, liquifying, churning, cutting and the like.

As illustrated in the drawings, there is provided a blender attachment generally designated as 10 which is illustrated in Fig. 1 as being associated with a well-known household mixer designated as 11. It will be understood that as far as the present invention is concerned, the construction of the food mixer 11 is not important so long as it is provided with means for transmitting rotary motion from the mixer motor to the blender attachment 10. As illustrated in the drawings, the food mixer 11 may be the conventional type of food mixer in many respects similar to the one disclosed in Graham et al. Patent No. 2,643,864, granted June 30, 1953, and assigned to the same assignee as the present application. As disclosed in that patent, the mixer 11 comprises a motor and gear unit 12 detachably and pivotally mounted to a more or less vertical support or upright 13 which in turn is mounted for limited pivotal movement about its vertical axis with respect to a base 14. As in the above-mentioned Graham et al. patent, the base 14 is preferably provided with a pair of spaced openings 15 and 16. The former opening normally receiving the pivotal support for a suitable turntable, not shown, which conventionally supports the mixing bowl and the other opening 16 being provided to accurately locate suitable attachments such as meat grinders, food slicers and shredders and the like which are commonly employed with such household mixers. The blender attachment 10 then comprises effectively another attachment for the food mixer 11.

A food mixer such as the food mixer 11 is generally provided with at least two beater sockets such as 17 and 18 for receiving therein suitable beaters, not shown, which are driven from the motor unit 12. As will become apparent from the ensuing description, the blender attachment 10 is provided with suitable means adapted to be inserted in one of the beater sockets 17 or 18 so that motive power from the motor unit 12 may be transmitted to the blender attachment 10. The motor unit 12, as was mentioned above, pivots about the upper end of the standard 13 about an axis transverse to the longitudinal motor axis so that in one position of the motor unit 12 the beater sockets 17 and 18 generally extend in a horizontal direction as contrasted with the normal vertical direction when the food mixer is in the position shown in Fig. 1 of the drawings.

Considering now the blender attachment 10, reference should be had to Figs. 2, 3, 4 and 5 of the drawings. It will be appreciated that to perform a satisfactory blending and chopping operation, it is essential for the blending mechanism to operate at relatively high speed, and, accordingly, it is necessary to provide in the blender attachment 10 a step-up gear mechanism. As illustrated, the blender attachment 10 comprises a vessel 20 having journaled in the bottom thereof a vertically disposed cutter spindle 21 which has secured to the end thereof disposed within the vessel 20 a pair of cutters which may be designated as an upper cutter 22 and a lower cutter 23. The cutter spindle 21 is adapted to be driven through a step-up gear mechanism, indicated generally by the reference numeral 24, disposed within a gear housing 25 from which protrudes a drive spindle 26. As illustrated, this spindle 26 extends in a generally vertical direction and, therefore, is in spaced parallel relationship with the cutter spindle 21. With this construction it will be apparent that the gear box or housing 25 for the step-up gearing 24 effectively horizontally spaces the drive spindle 26 from the cutter shaft or cutter spindle 21 thereby providing clearance between the liquid container 20 and the drive spindle 26.

The gear housing or casing 25 might be considered or designated as a horizontal gear casing, since it is a relatively flat casing disposed in a horizontal direction when positioned as indicated in Fig. 1 of the drawings, which is the normal position in use. Moreover, this casing houses a plurality of spur gears with the faces thereof disposed in a horizontal plane as shown in Fig. 1. As illustrated, gear casing 25 comprises an upper casing section 28 and a lower casing section 29 which are secured together by suitable fastening means 30 to provide therein a gear chamber. A plurality of these fastening means, best shown in Figs. 2 and 4 of the drawings, are preferably employed and may comprise screws threadedly engaging tapped openings defined in one of the casing sections. As illustrated, the lower gear casing section 29 preferably comprises a die casting of somewhat bullet shape having an upstanding peripheral flange 29a around the same to define the lower half of the gear chamber. This lower casing section 29 includes a plurality of integral cup-shaped projections 29b, 29c and 29d which define therein recesses or pockets for suitable shafts or the like described hereinafter. Additionally, the lower gear casing section 29 includes a pair of downwardly directed projections 29e and 29f which are adapted to cooperate with the openings 15 and 16, respectively, in the base 14 of the mixer 11 to properly position the blender attachment 10. The projections 29e and 29f extend below the casing section 29 a distance of almost an inch to provide a firm support when cooperating with the openings 15 and 16 in the base 14 of the mixer 11.

So that these projections 29e and 29f will not scratch or damage the base 14 of the mixer 11 when inserting the same, into openings 15 and 16 therein, there are preferably provided locating tabs which are associated one with each of the projections 29e and 29f. As illustrated, a locating pad 32 formed of nylon or other material is preferably secured as by a rivet 33 or the like to the outermost and closed end of the projection 29f. Similarly, a locating pad 34 which may be formed of a suitable plastic such as a synthetic rubber or a nylon is preferably held in position on the end of projection 29e by a suitable metal cup washer 35 and a rivet 36. The metal cup washer preferably includes a peripheral flange which fits into a cooperating groove in the locating pad 34. The rivet 36 preferably secures both the cup washer 35 and the locating pad 34 to the closed end of the projection 29e.

The upper half of the gear casing 25 includes a portion having a peripheral flange 28a which has a bullet shape substantially identical with that of the gear casing 29 so that two complementary casing halves are provided. Gear casing section 28 differs from section 29 in that it includes an integral horizontal portion extending over a part of the gear casing section 28, effectively defining a rectangular platform for supporting the mixing vessel 20 as will become apparent from the ensuing description. This platform 37 presents a relatively flat top with upwardly extending integral guides 37a, one disposed on each of the four sides of the rectangular platform 37. The center of the platform is provided with a circular depressed portion designated by the reference numeral 37b. A suitable opening 40 is preferably provided through the platform 37 within the confines of the depression 37b to permit any liquid that enters the depression 37b to escape.

To accommodate the spindle 26, the upper gear case section 28 is provided with an opening surrounded by a flange 28b through which the spindle 26 may extend. The flange 28b is preferably concentric with the projection 29b of the lower gear casing section 29. Similarly, the upper gear casing section is provided at the center of the depression 37b with a suitable opening 41 which is disposed immediately above and concentric with the projection 29d of the lower gear casing section 29.

For the purpose of accommodating the drive spindle 26, there is provided in the opening surrounded by the flange 28b in the upper gear case section 28, a suitable bearing 42 which may be a porous bronze bearing or the like. Similarly, in the recess defined by the cup-shaped projection 29b there is provided a similar bearing 43 so that the drive spindle 26 may be journaled in the bearings 42 and 43. Preferably, a thrust disc 44 disposed at the bottom of the recess in the cup-shaped projection 29b takes the vertical thrust of the drive spindle 26. The drive spindle is illustrated as being provided at an intermediate section thereof, disposed within the gear casing 25 with a knurled portion 47 so that there may be secured thereto a gear hub 45 of a main driving gear generally designated as 46. The gear 46 is illustrated as an inexpensive gear made up of a plurality of laminations which may be metal stampings. These stampings are then united with the hub 45 which is flanged at one end and the other end of which is peened over to hold the laminations defining the gear 46 together as a unitary structure. By virtue of the knurled portion 47 on the spindle 26, the gear 46 and the spindle 26 may readily be united by a press fit or the like to form a unitary element.

In order that the spindle 26 may be driven from the conventional kitchen mixer 11, the upper portion thereof is illustrated as being bifurcated to define a suitable notch 48 therein, which is capable of engaging a cooperating pin portion within the beater socket 18. With this arrangement, the drive spindle 26 may be driven in the same manner as a suitable beater inserted within the beater socket 18. It will be appreciated that any other suitable drive connection between the drive spindle 26 and the mixer motor 12 might equally well be employed and the specific arrangement illustrated is by way of example only.

To provide a first stage step-up gear mechanism, there is provided an intermediate gear 50 rotatable about a stationary stub shaft 51 which preferably is press fitted into a recess defined in the projection 29c on the lower gear case section 29. The upper end of the stationary shaft 51 is preferably received within a recess 28c defined within the upper gear case section 28. The intermediate gear 50 is preferably two gears in one, comprising a large main gear portion 50a and a pinion portion 50b. Preferably, the combined gear 50 is molded from a suitable plastic, such as nylon, and includes a metal insert 50c which provides increased strength. The metal insert preferably includes a flat disklike portion disposed within the body of the main gear and a lateral integral hub portion which is disposed within the body of the pinion gear portion 50b. The pinion gear portion is adapted to engage the teeth of the main driving gear 46 as is clearly shown in Fig. 2 of the drawings.

To provide another stage in the step-up gearing contained within gear casing 25, there is provided a shaft 52 journaled within bearings 53 and 54, the former bearing being disposed within the opening 41 in gear case section 28 and the latter being disposed within a recess defined in the projection 29d. Preferably, a thrust disk 55 is also provided within the recess beneath the bearing 54 to take the vertical thrust of the shaft 52. The cutter drive shaft 52 is indicated as having an intermediate knurled section 52a so as to have secured thereto as by a press fit or the like, a cutter gear 56 which meshes with the main gear portion 50a of the intermediate gear 50. In a device built in accordance with the present invention, the driving gear 46 was provided with fifty-six teeth, the main intermediate gear 50a was provided with fifty-six teeth, while the pinion portion 50b and the cutter gear 56 were provided with twenty teeth each, thus providing substantially a speed step-up of almost eight to one. It will be appreciated that the gear casing 25 may contain a suitable lubricant. In any event, a suitable quantity of grease is provided adjacent the mating portions of the gears, and, of course, adjacent the bearings.

As best shown in Figs. 3 and 5 of the drawings, the vessel 20 which is of rectangular shape, is preferably formed of heavy glass and is substantially larger in one direction of the rectangular configuration than the other. The narrow dimension is such that it is easy for the user readily to grasp the vessel 20 in one hand. The larger dimension then insures a large capacity vessel. As was mentioned above, the cutter shaft 21 extends through the bottom of the vessel and to this end, the vessel is provided, at the center of the bottom, with a suitable opening 60. To provide a bearing support for the cutter shaft 21 and moreover, to provide a seal for the opening 60, there is provided a sleeve 62 adapted to extend through the opening 60. The upper end of the sleeve is threaded and secured thereto is a special nut 63. To insure a liquid tight connection between the sleeve 62 and the bottom of the vessel 20, there are provided a pair of rubber gaskets 64, one against the upper side and one against the lower side of the bottom of the vessel 20. Preferably, a pair of compression washers 65 are provided to force the entire surface of the rubber gaskets 64 against the adjacent vessel wall. The sleeve 62 is preferably provided with a somewhat enlarged head 62a, preferably of hexagonal configuration, to permit engagement thereof by a suitable wrench. Thus, when the special nut 63 is tightened, the sleeve 62 is secured in place with a rubber gasket 64 clamped one on either side of the bottom of the vessel 20. Suitably supported within the sleeve 62 is a cutter shaft bearing 67, preferably formed of porous bronze or the like and the cutter shaft 21 is then journaled in this bearing 67.

As illustrated in the drawings, the lower end of the cutter shaft 21 is provided with a portion of reduced cross-section to which is secured a driving spanner 68, the reduced end of cutter shaft 21 extending through an opening in the driving spanner 68 which reduced end can then be peened over to firmly secure the driving spanner to the shaft 21. The driving spanner 68 effectively defines an upper clutch member associated with the vessel 20 for engaging with a cooperating clutch member to be described hereinafter, associated with the gear case 25. Actually, the driving spanner 68, best shown in Fig. 5, is a simple stamping having at either end thereof a pair of radially positioned downwardly directed fins 68a.

In order that the driving spanner 68 may be accommodated beneath the bottom of the vessel 20, the vessel 20 is provided with a depending flange 20a extending beneath the bottom thereof to define a bottom recess for housing the driving spanner 68. The flange 20a extends for a sufficient distance beneath the bottom of the vessel 20 so that when the vessel is supported on the flange 20a the depending fins 68a of the driving spanner 68 do not extend to the surface supporting the vessel 20.

It will be appreciated that the vessel 20 is designed to be supported on the horizontal platform 37 described above. Moreover, properly to locate the vessel 20 with respect to the platform 37, each side of the lower portion of the vessel is provided with a recess 70 to receive therein the guides 37a formed integral with the platform 37 and projecting upwardly as described above. To protect the vessel, the guides 37a are preferably disposed within resilient guide bumpers 71 formed of rubber or the like and best shown in Figs. 2 and 5 of the drawings. These guide bumpers 71 have a recess therein to receive the guides 37a and include a laterally projecting portion 71a defining feet upon which the flange 20a of the vessel 20 may rest. Specifically, the bottom of the peripheral flange 20a is thereby caused to rest on the projections 71a of the guide bumpers 71, and the guide bumpers are received within the recesses 70 defined one on either side of the rectangular vessel 20. Since the vessel is substantially narrower in one direction than the other, there will never be any question with respect to properly orientating the vessel with respect to the platform 37.

When the vessel 20 is supported on the platform 37 as is best shown in Fig. 2 of the drawings, the depression 37b defined in the platform 37 and the space beneath the bottom of the vessel 20 defined by the peripheral flange 20a define a chamber beneath the bottom of the vessel designated as 72, which chamber houses the clutch connection between the step-up gear mechanism 24 and the cutter spindle 21, one part of the clutch being the driving spanner 68. To this end there is secured to the upper end of cutter drive shaft 52 a bumper and driving wheel assembly generally designated by the reference numeral 75. As illustrated, this assembly comprises a flat disk 75a having an upwardly extending central hub portion 75b which is threadedly or otherwise secured to the upper end of the cutter drive shaft 52. A pair of lateral flanges projecting from the upstanding hub portion 75b connect the hub with means defining a pair of cylindrical recesses 75c, one on either side of the hub 75b as best shown in Fig. 5 of the drawings. These cylindrical recesses 75c are open at one side and specifically, the leading side assuming counterclockwise rotation, as viewed in Fig. 5. Moreover, a resilient bumper member designated as 77 is disposed in each recess 75c.

Each bumper member 77 includes a projecting portion which extends out of the open side of the cooperating recess 75c so that upon rotation of the cutter drive shaft 52, the rubber bumper portions 77 engage the depending fins 68a of the driving spanner 68 to rotate the latter. As illustrated in the drawings, the rubber bumpers 77 are provided with an integral head portion requiring that the bumpers be inserted from the bottom of the recesses 75c. Preferably, a suitable spacing washer 78 retains the rubber bumpers in position and also spaces the bumper and driving wheel assembly 75 properly with respect to the cutter drive shaft 52. It will be apparent that there has therefore been provided a very simple clutch arrangement for drivingly interconnecting in a removable manner the cutter spindle 21 and the cutter drive shaft 52. The rubber bumper members 77 provide the engaging faces of the clutch and consequently, the driving spanner or upper clutch member 68 can comprise a simple stamping as was mentioned above. The clutch is very easy to manufacture, is compact and can be contained within the small chamber 72. Furthermore, the coupling of the clutch members is relatively loose so that there is no need for accurate alignment.

For the purpose of securing the upper and lower cutters 22 and 23 to the cutter spindle 21, the upper end of the latter is threaded. Accordingly, there is supported on the upper end of the spindle 21 a thrust washer 80, above which is supported a cup washer 81 having the depending flanges thereof surrounding the sleeve 62 to cause any material being mixed to be thrown away from the sleeve bearing 67. The lower cutter 23 is then disposed above the cup washer 81 followed by the upper cutter 22 which is disposed directly above the lower cutter 23. A suitable lock washer 83 is then disposed above the upper cutter 22 followed by a cap nut 84 for securing the cutter assembly to the upper end of the cutter spindle 21. As illustrated, the lower cutter 22 has its arms disposed in a substantially horizontal plane, thereby effectively comprising a pair of cutter arms extending in a lateral direction from the cutter spindle 21. The upper cutter, however, is provided with a pair of cutter arms extending upwardly at an angle of the order of 45° as is best shown in Fig. 2 of the drawings. The edges of the arms of the cutters 22 and 23 at the leading sides thereof are relatively sharp to perform a desirable cutting and disintegrating action. Preferably, the blades of the cutters 22 and 23 extend with little clearance almost to the walls of the container, defining the short dimension thereof. Moreover, to aid in breaking up the generally circular movement of the mass to be mixed within the vessel, a pair of inwardly projecting ribs 86 are provided on opposed walls of the mixing vessel 20. To avoid any stagnant pockets at the bottom of the vessel, the corners are preferably filled up to make a configuration approaching the circular adjacent the bottom, as is evident from Fig. 3 of the drawings. In order to prevent splashing outside the vessel of the material being mixed therein, there preferably is provided a suitable resilient cover 90 for the top of the vessel 20, which may be formed of a suitable plastic, such as polyethylene or the like.

From the above description, it will be apparent that there has been provided a very simple and compact blender attachment for a conventional household mixer. In order to apply the blender attachment to the mixer, the mixer bowl base (not shown) which is supported from the base 14 is removed and the beaters are also removed from the beater sockets 17 and 18. The mixer motor is then tilted back upon the stand 13, whereupon the drive spindle 26 may readily be inserted into beater socket 18, to such an extent that the drive pin in the socket engages the notch 48 at the upper end of the drive spindle 26. This may be accomplished by energizing the motor unit 12 momentarily. Thereafter, the motor is turned off and the motor unit 12 is tilted forwardly toward the final position shown in Fig. 1 of the drawings. The forward tilting causes the projections 29e and 29f which might be termed feet, to fit into the two holes 15 and 16, respectively, in the base 14. The vessel 20 can then be positioned on the platform 37 whereupon the motor may be energized at a relatively low speed and the ingredients to be mixed inserted into the vessel 20. The cover 90 can then be placed on the vessel and the mixer motor 12 energized at the speed desired for the particular operation. Preferably, when the device is used to liquify fruits, vegetables and the like, the material to be liquified is diced into one or two inch cubes. Also, a small quantity of liquid, such as water, fruit or vegetable juice, is first placed in the bottom of the blender. Where the blending of liquids is to be accomplished, all of the ingredients may be added at once and within a few seconds, the blending operation will be completed.

In view of the detailed description included above, the operation of the present invention, and particularly the blender attachment will readily be understood by those skilled in the art. A very simple compact mechanism is provided which requires a small fraction of the storage space required for an independent so-called blender having its own prime mover, and of course, the cost is much less for the device of the present invention. With the present invention, there is provided a blender with drive means therefor positioned laterally from the vessel with the driving connection actually extending vertically along side of the blending vessel. There is, moreover, provided a very simple and compact clutch which insures proper driving connection between the cutter spindle and the drive shaft in every case. Furthermore, by the improved configuration of the mixing vessel, a very satisfactory mixing container is provided which insures the maximum in satisfactory blending and mixing.

While there has been illustrated and described a particular embodiment of the present invention, it will be appreciated that numerous changes and modifications are likely to occur to those skilled in the art, and it is intended in the appended claims to cover all those changes and modifications as fall within the true spirit and scope of the present invention.

What is claimed as new and desired to be secured by Letters Patent of the United States is:

1. In combination, a food mixer having a motor and a support base extending under said motor, means on said base for supporting said motor, a unitary drive attachment for said mixer comprising casing means, cooperating means on said base and said casing means for supporting said casing means on said base in a predetermined position, a platform on said casing means in a position offset horizontally from said motor when said casing means is in said predetermined position, upwardly directed input drive means extending from said casing means in a position below said motor and driven by said motor, upwardly directed output drive means extending from said casing means at said platform, and transmission means in said casing means drivingly interconnecting said input drive means and said output drive means.

2. The combination of claim 1 wherein said mixer includes a readily removable open top mixing vessel supported on said platform, a cutter spindle journaled in and extending through the bottom of said vessel, rotating blade means disposed in the lower portion of said vessel and drivingly connected to said cutter spindle, and means for drivingly interconnecting said cutter spindle and said upwardly directed output drive means when said mixing vessel is supported on said platform.

3. The combination of claim 2 wherein said last mentioned means includes a first rotatable element in the form of a metal stamping with fingers extending in a vertical direction and a second rotatable element having spaced resilient bumpers supported thereon, which bumpers extend into the path of movement of said fingers.

4. The combination of claim 2 wherein said mixing vessel has a rectangular cross section with one dimension of said cross section substantially less than the other dimension, the short dimension being such as to permit ready grasping by one hand of a housewife.

References Cited in the file of this patent

UNITED STATES PATENTS

| | | |
|---|---|---|
| 1,445,112 | Titus et al. | Feb. 13, 1923 |
| 1,611,281 | Ruggaber | Dec. 21, 1926 |
| 1,799,136 | Robinson | Mar. 31, 1931 |
| 2,066,956 | Williams | Jan. 5, 1937 |
| 2,258,533 | Brickman | Oct. 7, 1941 |
| 2,278,125 | Landgraf | Mar. 31, 1942 |
| 2,284,155 | Landgraf | May 26, 1942 |
| 2,309,347 | Landgraf | Jan. 26, 1943 |
| 2,585,255 | Kochner et al. | Feb. 12, 1952 |
| 2,607,232 | Von Haase | Aug. 19, 1952 |
| 2,795,958 | Frank | June 18, 1957 |